(12) United States Patent
Kramer et al.

(10) Patent No.: US 10,664,327 B2
(45) Date of Patent: May 26, 2020

(54) PROTEINS, POOLS, AND SLAWX IN PROCESSING ENVIRONMENTS

(71) Applicant: Oblong Industries, Inc., Los Angeles, CA (US)

(72) Inventors: Kwindla Hultman Kramer, Los Angeles, CA (US); John S. Underkoffler, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 0 days.

(21) Appl. No.: 15/705,077

(22) Filed: Sep. 14, 2017

(65) Prior Publication Data

US 2018/0004583 A1    Jan. 4, 2018

Related U.S. Application Data

(63) Continuation of application No. 13/850,837, filed on Mar. 26, 2013, now Pat. No. 9,804,902, which is a
(Continued)

(51) Int. Cl.
*G06F 9/54* (2006.01)
*G06F 9/451* (2018.01)

(52) U.S. Cl.
CPC .............. *G06F 9/542* (2013.01); *G06F 9/451* (2018.02); *G06F 9/544* (2013.01)

(58) Field of Classification Search
CPC ........... G06F 9/542; G06F 9/451; G06F 9/544
See application file for complete search history.

(56) References Cited

U.S. PATENT DOCUMENTS

| 4,843,568 A | 6/1989 | Krueger et al. |
| 5,454,043 A | 9/1995 | Freeman |

(Continued)

FOREIGN PATENT DOCUMENTS

| EP | 0899651 | 3/1999 |
| EP | 1883238 | 4/2014 |

(Continued)

OTHER PUBLICATIONS

Addison-Wesley: "Inside Macintosh-vol. I", vol. I Chapter 1-8, Jan. 1, 1985 (Jan. 1, 1985), pp. 1-58.
(Continued)

*Primary Examiner* — Charles E Anya
(74) *Attorney, Agent, or Firm* — Jeffrey Schox; Shant Tchakerian

(57) ABSTRACT

Embodiments described herein include mechanisms for encapsulating data that needs to be shared between or across processes. These mechanisms include slawx (plural of "slaw"), proteins, and pools. Generally, slawx provide the lowest-level of data definition for inter-process exchange, proteins provide mid-level structure and hooks for querying and filtering, and pools provide for high-level organization and access semantics. Slawx includes a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

20 Claims, 15 Drawing Sheets

Related U.S. Application Data continuation of application No. 12/109,263, filed on Apr. 24, 2008, now Pat. No. 8,407,725.

(60) Provisional application No. 60/926,116, filed on Apr. 24, 2007.

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,651,107 A | 7/1997 | Frank et al. |
| 5,982,352 A | 11/1999 | Pryor |
| 6,002,808 A | 12/1999 | Freeman |
| 6,043,805 A | 3/2000 | Hsieh |
| 6,049,798 A | 4/2000 | Bishop et al. |
| 6,072,494 A | 6/2000 | Nguyen |
| 6,075,895 A | 6/2000 | Qiao et al. |
| 6,191,773 B1 | 2/2001 | Maruno et al. |
| 6,198,485 B1 | 3/2001 | Mack et al. |
| 6,215,890 B1 | 4/2001 | Matsuo et al. |
| 6,222,465 B1 | 4/2001 | Kumar et al. |
| 6,256,033 B1 | 7/2001 | Nguyen |
| 6,351,744 B1 | 2/2002 | Landresse |
| 6,385,331 B2 | 5/2002 | Harakawa et al. |
| 6,456,728 B1 | 9/2002 | Doi et al. |
| 6,501,515 B1 | 12/2002 | Iwamura |
| 6,515,669 B1 | 2/2003 | Mohri |
| 6,703,999 B1 | 3/2004 | Iwanami et al. |
| 6,807,583 B2 | 10/2004 | Hrischuk et al. |
| 6,819,782 B1 | 11/2004 | Imagawa et al. |
| 6,950,534 B2 | 9/2005 | Cohen et al. |
| 7,034,807 B2 | 4/2006 | Maggioni |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,109,970 B1 | 9/2006 | Miller |
| 7,129,927 B2 | 10/2006 | Mattsson |
| 7,145,551 B1 | 12/2006 | Bathiche et al. |
| 7,159,194 B2 | 1/2007 | Wong et al. |
| 7,164,117 B2 | 1/2007 | Breed et al. |
| 7,170,492 B2 | 1/2007 | Bell |
| 7,227,526 B2 | 6/2007 | Hildreth et al. |
| 7,229,017 B2 | 6/2007 | Richley et al. |
| 7,259,747 B2 | 8/2007 | Bell |
| 7,280,346 B2 | 10/2007 | Lewis et al. |
| 7,340,077 B2 | 3/2008 | Gokturk et al. |
| 7,348,963 B2 | 3/2008 | Bell |
| 7,366,368 B2 | 4/2008 | Morrow et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,379,613 B2 | 5/2008 | Dowski, Jr. et al. |
| 7,389,591 B2 | 6/2008 | Jaiswal et al. |
| 7,421,093 B2 | 9/2008 | Hildreth et al. |
| 7,428,542 B1 | 9/2008 | Fink et al. |
| 7,428,736 B2 | 9/2008 | Dodge et al. |
| 7,430,312 B2 | 9/2008 | Gu |
| 7,436,595 B2 | 10/2008 | Cathey, Jr. et al. |
| 7,466,308 B2 | 12/2008 | Dehlin |
| 7,519,223 B2 | 4/2009 | Dehlin et al. |
| 7,555,142 B2 | 6/2009 | Hildreth et al. |
| 7,555,613 B2 | 6/2009 | Ma |
| 7,559,053 B2 | 7/2009 | Krassovsky et al. |
| 7,570,805 B2 | 8/2009 | Gu |
| 7,574,020 B2 | 8/2009 | Shamaie |
| 7,576,727 B2 | 8/2009 | Bell |
| 7,598,942 B2 | 10/2009 | Underkoffler et al. |
| 7,627,834 B2 | 12/2009 | Rimas-Ribikauskas et al. |
| 7,665,041 B2 | 2/2010 | Wilson et al. |
| 7,685,083 B2 | 3/2010 | Fairweather |
| 7,692,131 B2 | 4/2010 | Fein et al. |
| 7,725,547 B2 | 5/2010 | Albertson et al. |
| 7,822,267 B2 | 10/2010 | Gu |
| 7,827,698 B2 | 11/2010 | Jaiswal et al. |
| 7,834,846 B1 | 11/2010 | Bell |
| 7,848,542 B2 | 12/2010 | Hildreth |
| 7,850,526 B2 | 12/2010 | Zalewski et al. |
| 7,854,655 B2 | 12/2010 | Mao et al. |
| 7,898,522 B2 | 3/2011 | Hildreth et al. |
| 7,949,157 B2 | 5/2011 | Afzulpurkar et al. |
| 7,966,353 B2 | 6/2011 | Wilson |
| 7,979,850 B2 | 7/2011 | Ivanov et al. |
| 7,984,452 B2 | 7/2011 | Chakravarty et al. |
| 7,991,920 B2 | 8/2011 | Back et al. |
| 8,059,089 B2 | 11/2011 | Daniel |
| 8,094,873 B2 | 1/2012 | Kelusky et al. |
| 8,116,518 B2 | 2/2012 | Shamaie et al. |
| 8,212,550 B2 | 7/2012 | Katsurahira et al. |
| 8,254,543 B2 | 8/2012 | Sasaki et al. |
| 8,259,996 B2 | 9/2012 | Shamaie |
| 8,269,817 B2 | 9/2012 | Kumar et al. |
| 8,274,535 B2 | 9/2012 | Hildreth et al. |
| 8,280,732 B2 | 10/2012 | Richter et al. |
| 8,300,042 B2 | 10/2012 | Bell |
| 8,325,214 B2 | 12/2012 | Hildreth |
| 8,341,635 B2 | 12/2012 | Arimilli et al. |
| 8,355,529 B2 | 1/2013 | Wu et al. |
| 8,363,098 B2 | 1/2013 | Rosener et al. |
| 8,370,383 B2 | 2/2013 | Kramer et al. |
| 8,407,725 B2 | 3/2013 | Kramer et al. |
| 8,472,665 B2 | 6/2013 | Hildreth |
| 8,531,396 B2 | 9/2013 | Underkoffler et al. |
| 8,537,111 B2 | 9/2013 | Underkoffler et al. |
| 8,537,112 B2 | 9/2013 | Underkoffler et al. |
| 8,559,676 B2 | 10/2013 | Hildreth |
| 8,565,535 B2 | 10/2013 | Shamaie |
| 8,625,849 B2 | 1/2014 | Hildreth et al. |
| 8,659,548 B2 | 2/2014 | Hildreth |
| 8,666,115 B2 | 3/2014 | Perski et al. |
| 8,669,939 B2 | 3/2014 | Underkoffler et al. |
| 8,681,098 B2 | 3/2014 | Underkoffler et al. |
| 8,704,767 B2 | 4/2014 | Dodge et al. |
| 8,723,795 B2 | 5/2014 | Underkoffler et al. |
| 8,726,194 B2 | 5/2014 | Hildreth |
| 8,745,541 B2 | 6/2014 | Wilson et al. |
| 8,769,127 B2 | 7/2014 | Selimis et al. |
| 8,856,691 B2 | 10/2014 | Geisner et al. |
| 8,866,740 B2 | 10/2014 | Underkoffler et al. |
| 9,063,801 B2 | 6/2015 | Kramer et al. |
| 9,213,890 B2 | 12/2015 | Huang et al. |
| 9,261,979 B2 | 2/2016 | Shamaie et al. |
| 9,465,457 B2 | 10/2016 | Thompson et al. |
| 9,684,380 B2 | 6/2017 | Kramer et al. |
| 9,740,293 B2 | 8/2017 | Kramer et al. |
| 2002/0065950 A1 | 5/2002 | Katz et al. |
| 2002/0085030 A1 | 7/2002 | Ghani |
| 2002/0184401 A1 | 12/2002 | Kadel et al. |
| 2002/0186200 A1 | 12/2002 | Green |
| 2003/0048280 A1 | 3/2003 | Russell |
| 2004/0125076 A1 | 7/2004 | Green |
| 2005/0212753 A1 | 9/2005 | Marvit et al. |
| 2005/0283752 A1* | 12/2005 | Fruchter ............ G06F 17/3079 717/100 |
| 2006/0269145 A1 | 11/2006 | Roberts |
| 2007/0078966 A1* | 4/2007 | Bromley ................ G06F 9/451 709/224 |
| 2007/0288467 A1 | 12/2007 | Strassner et al. |
| 2008/0036743 A1* | 2/2008 | Westerman ............ G06F 3/038 345/173 |
| 2008/0040692 A1* | 2/2008 | Sunday ............... G06F 3/04883 715/863 |
| 2008/0059578 A1* | 3/2008 | Albertson ............... G06F 3/016 709/204 |
| 2008/0143675 A1 | 6/2008 | Hsieh et al. |
| 2008/0143975 A1* | 6/2008 | Dennard ................ G03B 21/26 353/42 |
| 2008/0208517 A1 | 8/2008 | Shamaie |
| 2008/0222660 A1 | 9/2008 | Tavi et al. |
| 2009/0262074 A1 | 10/2009 | Nasiri et al. |
| 2010/0060568 A1 | 3/2010 | Fisher et al. |
| 2010/0125816 A1 | 5/2010 | Bezos |
| 2010/0315439 A1 | 12/2010 | Huang et al. |

(56) References Cited

U.S. PATENT DOCUMENTS

2012/0229383 A1 9/2012 Hamilton et al.
2012/0239396 A1 9/2012 Johnston et al.

FOREIGN PATENT DOCUMENTS

| WO | 009972 | 10/1989 |
|----|--------|---------|
| WO | 035633 | 7/1999 |
| WO | 134452 | 11/2008 |
| WO | 030822 | 3/2010 |

OTHER PUBLICATIONS

Bacon J., et al., "Using Events to Build Distributed Applications", Second International Workshop on Services in Distributed and Networked Environments, 1995, pp. 148-155.

Bretzner, Lars et al. "A Prototype System for Computer Vision Based Human Computer Interaction", Technical report CVA251, ISRN KTH NA/P-01/09-SE. Department of Numerical Analysis and Computer Science, KTH (Royal Institute of Technology), S-100 44 Stockh.

Jiang H., et al., "Demis: A Dynamic Event Model for Interactive Systems", Proceedings of the Acm Symposium on Virtual Reality Software and Technology, 2002, pp. 97-104.

Johanson B., et al., "The Event Heap: A Coordination Infrastructure for Interactive Workspaces", Proceedings Fourth IEEE Workshop on Mobile Computing Systems and Applications, 2002, pp. 83-93.

Johanson B., et al., "The Interactive Workspaces Project: Experiences with Ubiquitous Computing Rooms", IEEE Pervasive Computing, 2002, vol. 1 (2), pp. 67-74.

Mansouri-Samani M., et al., "A Configurable Event Service for Distributed Systems", Third International Conference on Annapolis Configurable Distributed Systems, 1996, pp. 210-217.

Michael J Carey., et al., "The Architecture of the Exodus Extensible Dbms", Proceeding OODS, 1986, pp. 52-65.

Rubine D., "Specifying Gestures by Example", Computer Graphics, 1991, vol. 25 (4), pp. 329-337.

Velipasalar S., et al., "Specifying, Interpreting and Detecting High-level, Spatio-Temporal Composite Events in Single and Multi-Camera Systems", Conference on Computer Vision and Pattern Recognition Workshop, 2006, pp. 110-110.

William A McCuskey., "On Automatic Design of Data Organization", American Federation of Information Processing Societies, 1970, pp. 187-199.

* cited by examiner first quadword of every slaw

|  | 76543210 | 76543210 | 76543210 | 76543210 |
|---|---|---|---|---|
| length-follows: | 1xxxxxxx | xxxxxxxx | xxxxxxxx | xxxxxxxx |
| eight-byte length: | 11xxxxxx | xxxxxxxx | xxxxxxxx | xxxxxxxx |
|  |  |  |  |  |
| wee cons: | 01xxxxxx | xxxxxxxx | xxxxxxxx | xxxxxxxx |
| wee cons quadlen: | rrqqqqqq | qqqqqqqq | qqqqqqqq | qqqqqqqq |
| wee string: | 001xxxxx | xxxxxxxx | xxxxxxxx | xxxxxxxx |
| wee string quadlen: | rrrqqqqq | qqqqqqqq | qqqqqqqq | qqqqqqqq |
| wee list: | 0001xxxx | xxxxxxxx | xxxxxxxx | xxxxxxxx |
| wee list quadlen: | rrrrqqqq | qqqqqqqq | qqqqqqqq | qqqqqqqq |
|  |  |  |  |  |
| full string: | 1*100000 | 00000000 | 00000000 | 00000001 |
| full cons: | 1*100000 | 00000000 | 00000000 | 00000010 |
|  |  |  |  |  |
| full list: | 1*100000 | 00000000 | 00000000 | 00000011 |

(the penulti-MSB above is zero or one as the length is contained in the next one or two quadwords, i.e. if it's a four or eight byte length, per the 'eight-byte length' bit description second from top)

| numeric: | 00001xxx | xxxxxxxx | xxxxxxxx | xxxxxxxx |
|---|---|---|---|---|
|  |  |  |  |  |
| numeric float: | xxxxx1xx | xxxxxxxx | xxxxxxxx | xxxxxxxx |
| numeric complex: | xxxxxx1x | xxxxxxxx | xxxxxxxx | xxxxxxxx |
| numeric unsigned: | xxxxxxx1 | xxxxxxxx | xxxxxxxx | xxxxxxxx |
| numeric wide: | xxxxxxxx | 1xxxxxxx | xxxxxxxx | xxxxxxxx |
| numeric stumpy: | xxxxxxxx | x1xxxxxx | xxxxxxxx | xxxxxxxx |
| numeric reserved: | xxxxxxxx | xx1xxxxx | xxxxxxxx | xxxxxxxx |

FIG.6B1

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

```
numeric 2-vector:      xxxxxxxx  xxx01xxx  xxxxxxxx  xxxxxxxx
numeric 3-vector:      xxxxxxxx  xxx10xxx  xxxxxxxx  xxxxxxxx
numeric 4-vector:      xxxxxxxx  xxx11xxx  xxxxxxxx  xxxxxxxx
``` for any numeric entity, array or not, a size-in-bytes-minus-one is stored in the last eight bits -- if a singleton, this describes the size of the data part; if an array, it's the size of a single element -- so:

```
num'c unit bsize mask:  00001xxx  xxxxxxxx  xxxxxxxx  mmmmmmmm
``` and for arrays, there're these:

```
num'c breadth follows:   xxxxxxxx  xxxxx1xx  xxxxxxxx  xxxxxxxx
num'c 8-byte breadth:    xxxxxxxx  xxxxx11x  xxxxxxxx  xxxxxxxx
num'c wee breadth mask:  xxxxxxxx  xxxxx0mm  mmmmmmmm  xxxxxxxx
```

PROTEINS, POOLS, AND SLAWX IN PROCESSING ENVIRONMENTS

CROSS-REFERENCE TO RELATED APPLICATIONS

This application is a continuation of U.S. patent application Ser. No. 13/850,837 filed 26 Mar. 2013, now issued as U.S. Pat. No. 9,804,902, which is a continuation of U.S. patent application Ser. No. 12/109,263, filed 24 Apr. 2008, now issued as U.S. Pat. No. 8,407,725, which claims the benefit of U.S. Provisional Patent Application Ser. No. 60/926,116, filed 24 Apr. 2007.

The present application is related to U.S. patent application Ser. No. 11/350,697, filed 8 Feb. 2006, now issued as U.S. Pat. No. 7,598,942, which claims the benefit of U.S. Provisional Patent Application 60/651,290, filed 8 Feb. 2005.

TECHNICAL FIELD

Embodiments are described relating to the representation, manipulation, and exchange of data within and between computing processes.

BACKGROUND

Conventional programming environments do not fully support multi-computer processing unit (CPU) and cross-network execution, or flexible sharing of data between large numbers of computing processes.

For example, conventional user-facing computing platforms (e.g., OS X, Microsoft Windows, X Windows atop UNIX) provide facilities for transmitting event data between processes. But these existing mechanisms all suffer from shortcomings that make it difficult to build multi-process and multi-machine applications, and that force users working in more than one programming language to jump through frustrating hoops. For example, conventional event frameworks are strongly typed, which makes them inflexible, privileges the assumptions of the systems vendor over the application programmer, and forms a mismatch with the facilities of increasingly popular dynamic languages (e.g., Ruby, Python and Perl). The conventional frameworks are also configured only to support point-to-point data transfers, which makes coordinating the activity of more than a few distinct processes difficult or impossible. The conventional frameworks are also strongly dependent on particular local, in-memory data structures, which renders them unsuited for on-disk storage or transmission across a network.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

2

Figure 3:
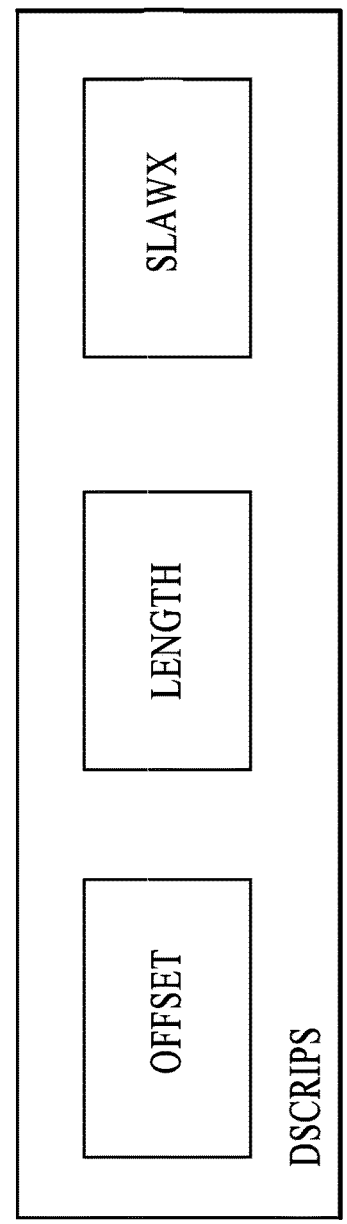

FIG. 3 is a block diagram of a descrip, under an embodiment.

Figure 4:
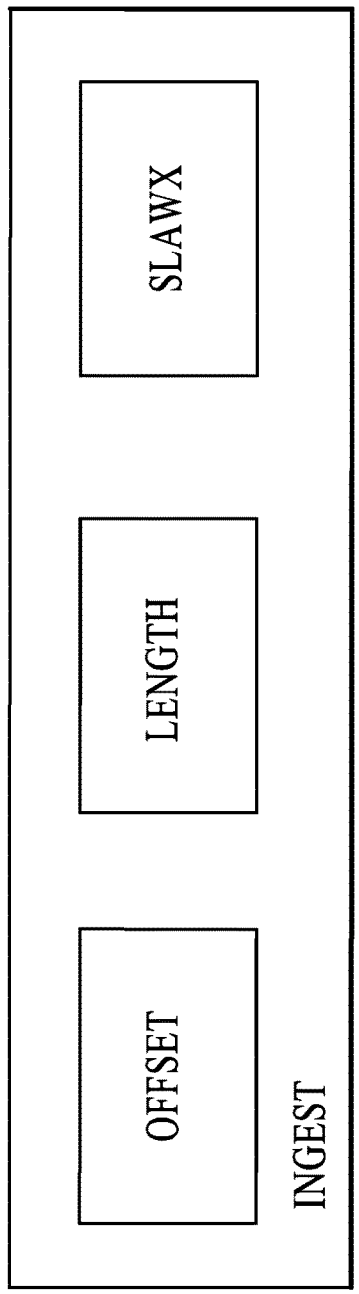

FIG. 4 is a block diagram of an ingest, under an embodiment.

Figure 5:
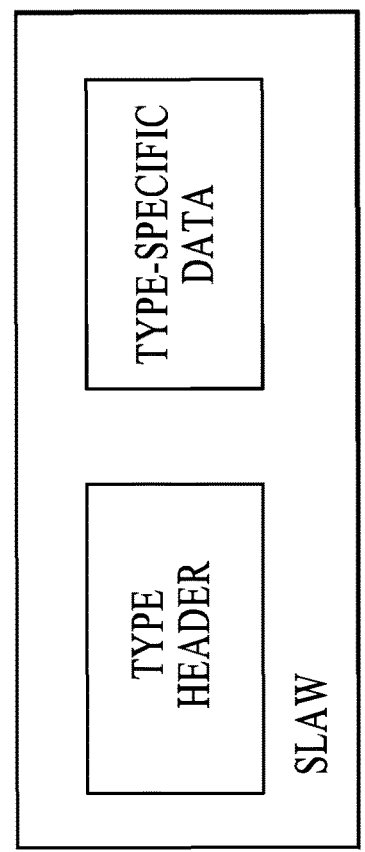

FIG. 5 is a block diagram of a slaw, under an embodiment.

Figure 6A:
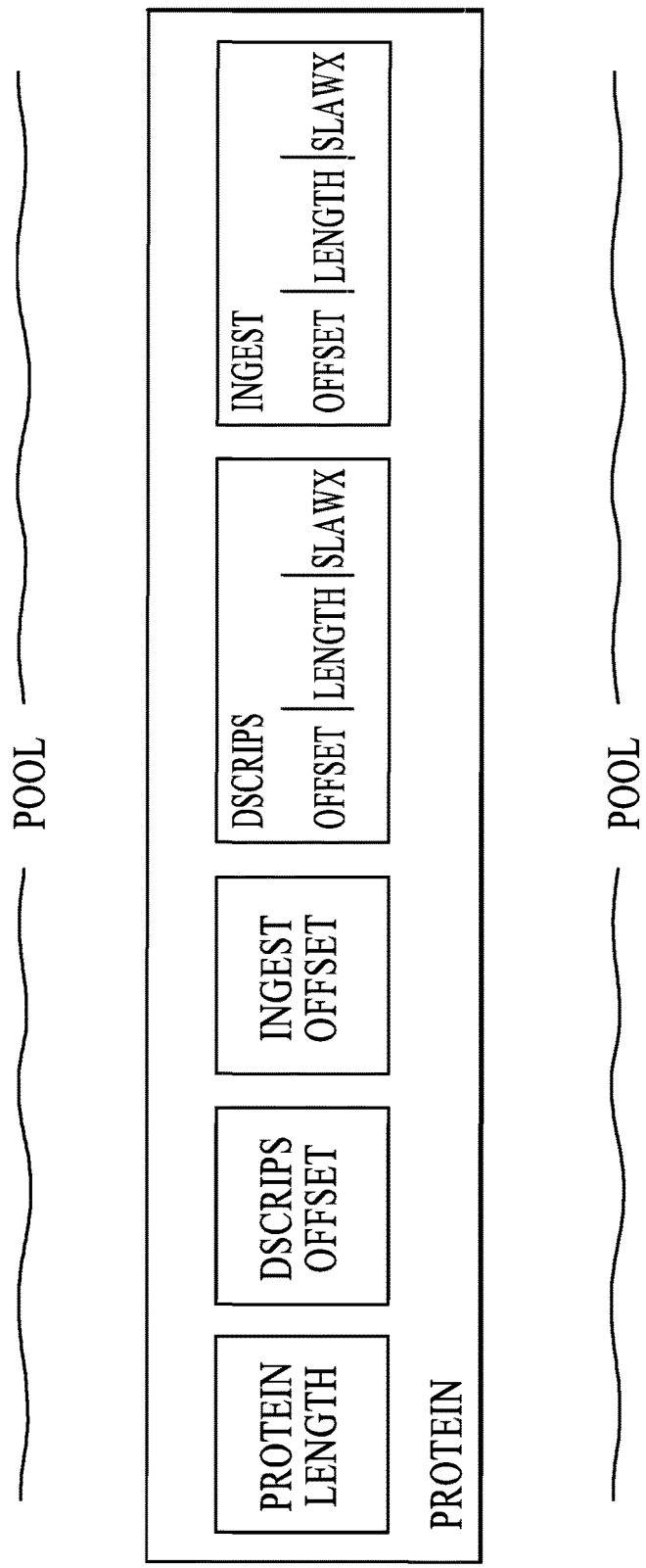

FIG. 6A is a block diagram of a protein in a pool, under an embodiment.

Figure 1:
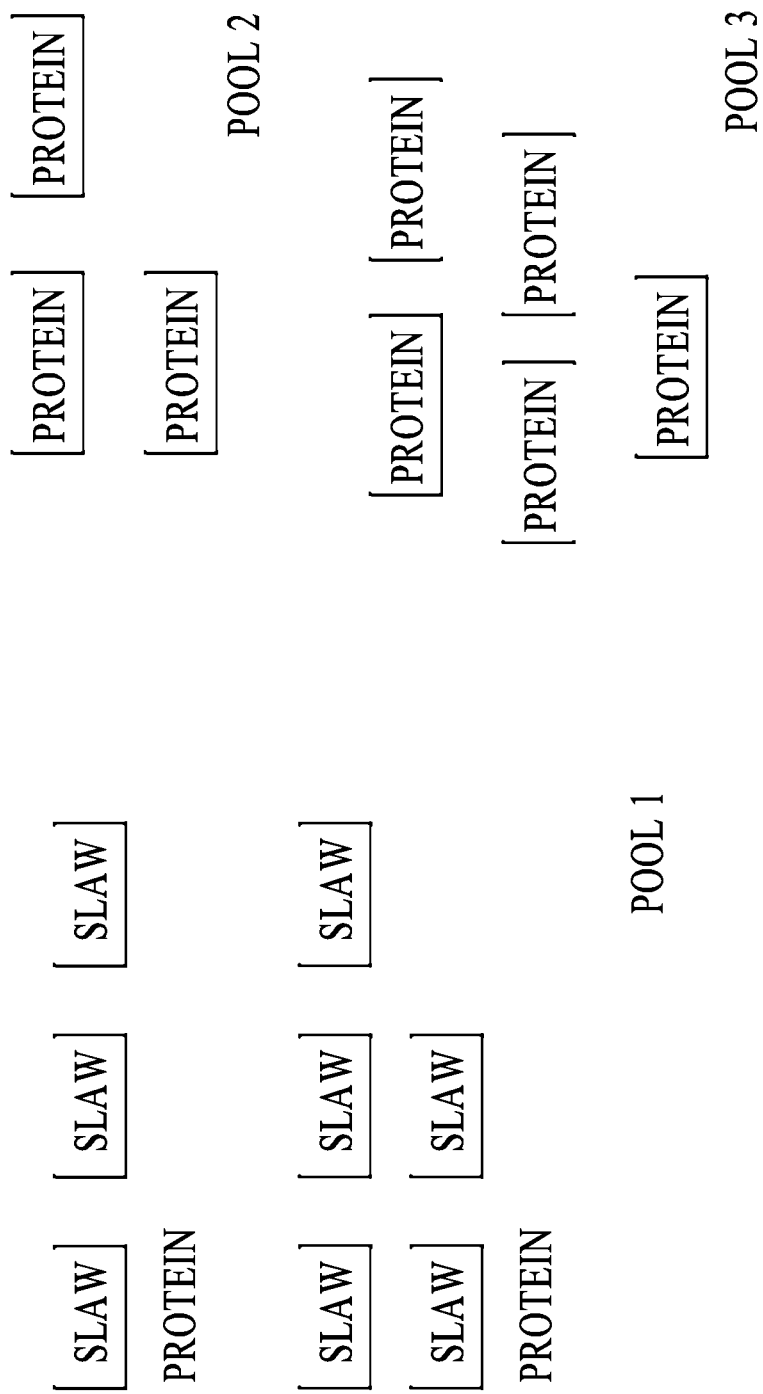
FIG. 1 is a block diagram of a processing environment including data representations using slawx, proteins, and pools, under an embodiment.
Figure 2:
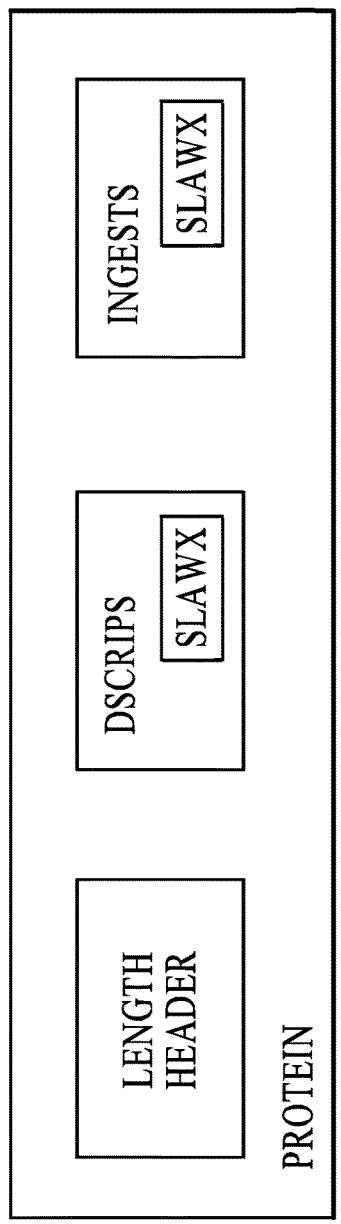
FIG. 2 is a block diagram of a protein, under an embodiment.

FIGS. 6B1 and 6B2 show a slaw header format, under an embodiment.

Figure 6C:
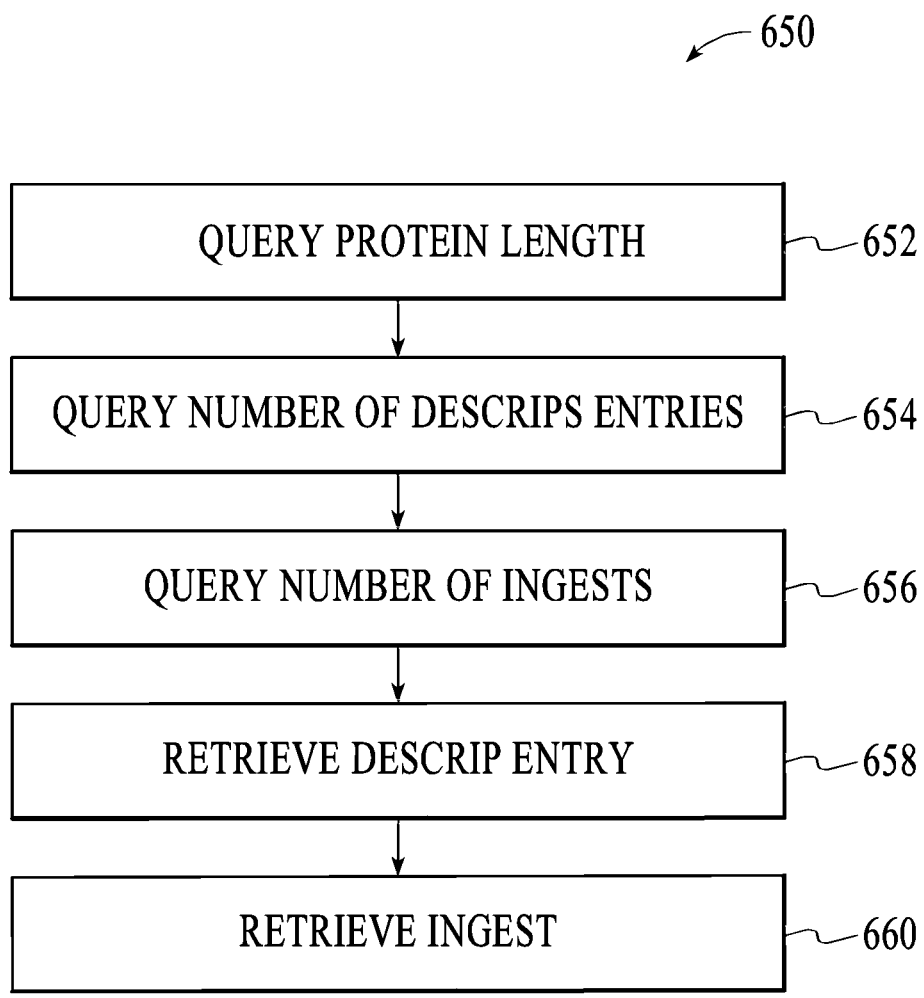

FIG. 6C is a flow diagram for using proteins, under an embodiment.

Figure 6D:
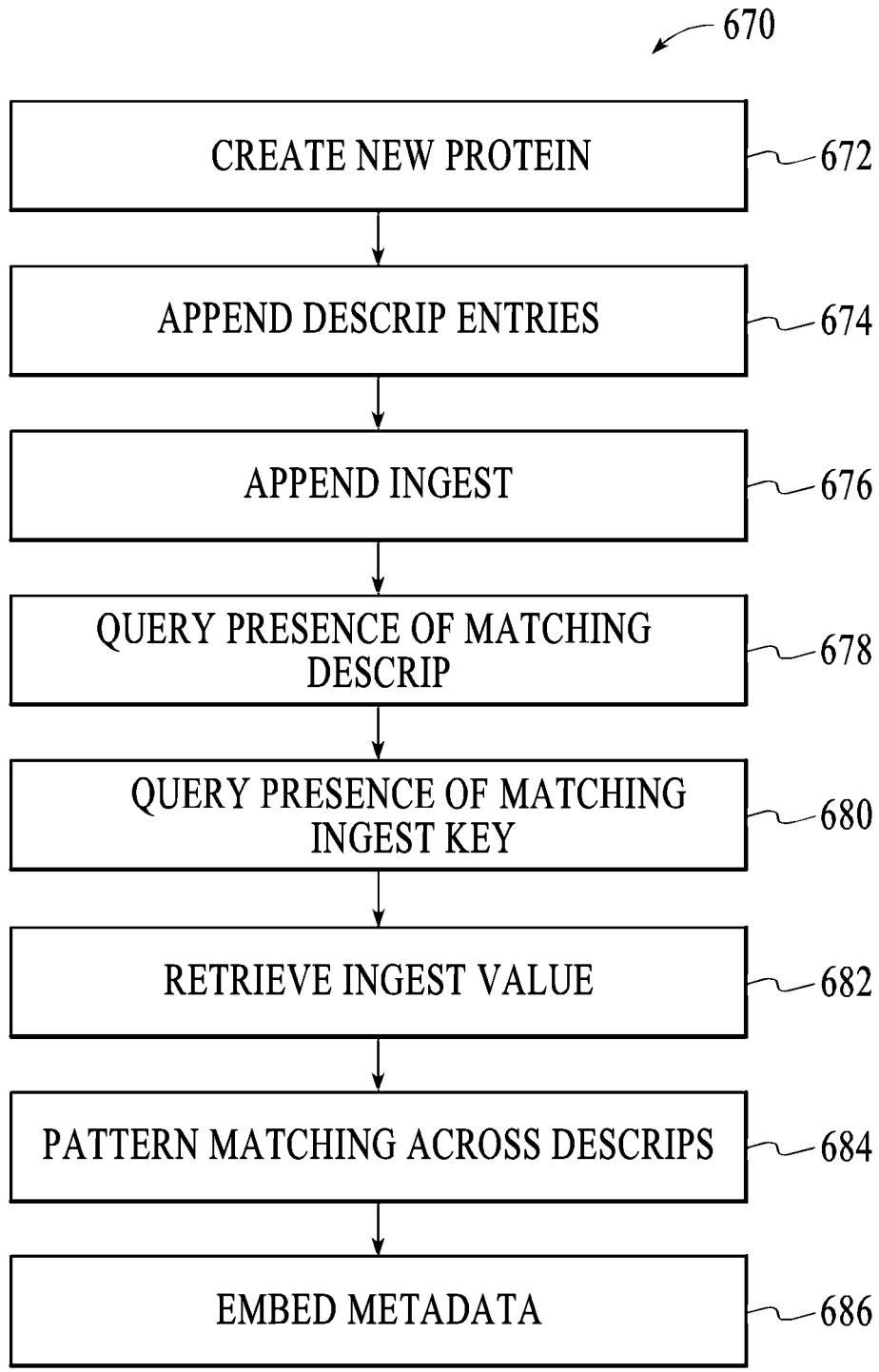

FIG. 6D is a flow diagram for constructing or generating proteins, under an embodiment.

Figure 7:
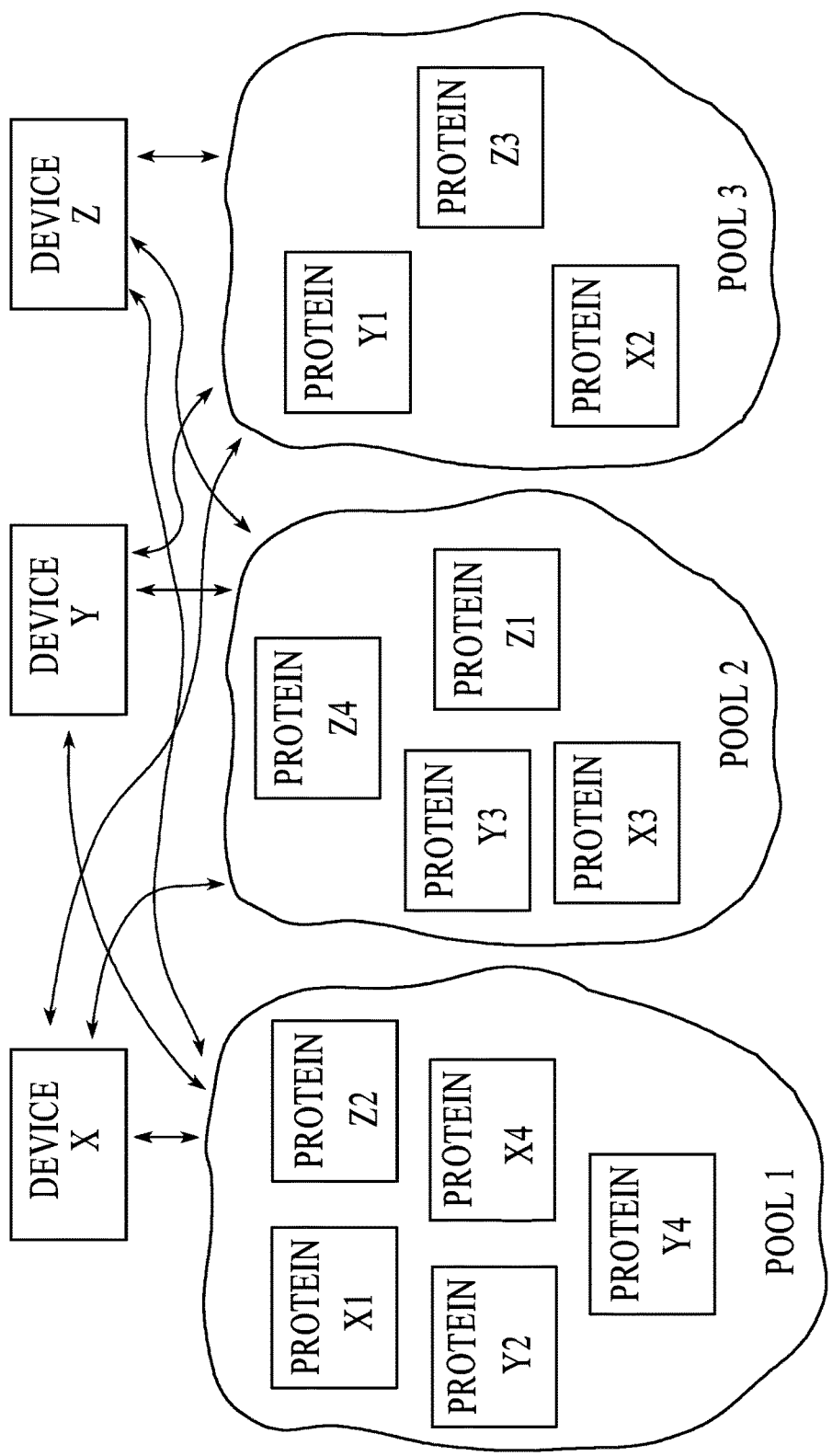

FIG. 7 is a block diagram of a processing environment including data exchange using slawx, proteins, and pools, under an embodiment.

Figure 8:
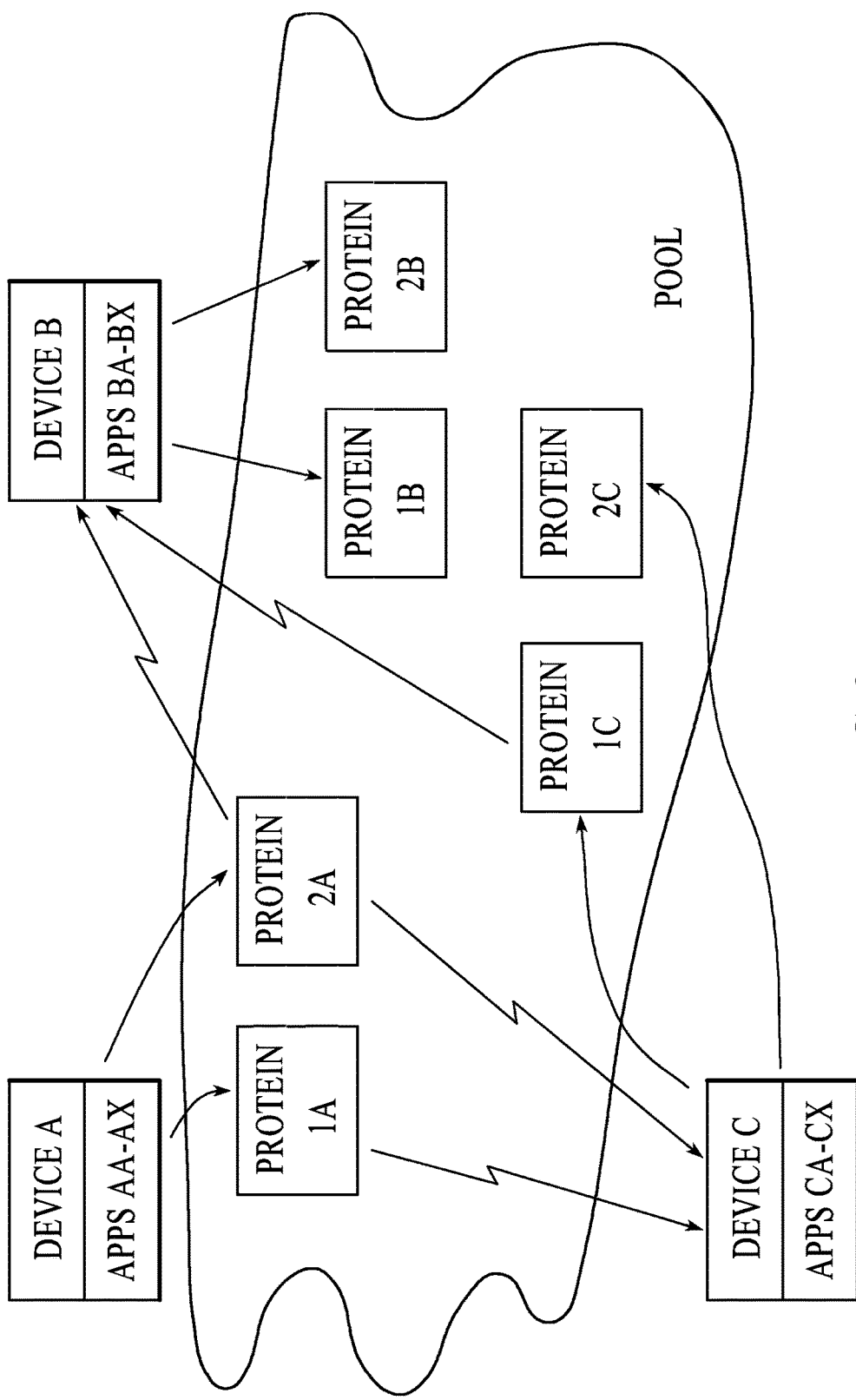

FIG. 8 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment.

Figure 9:
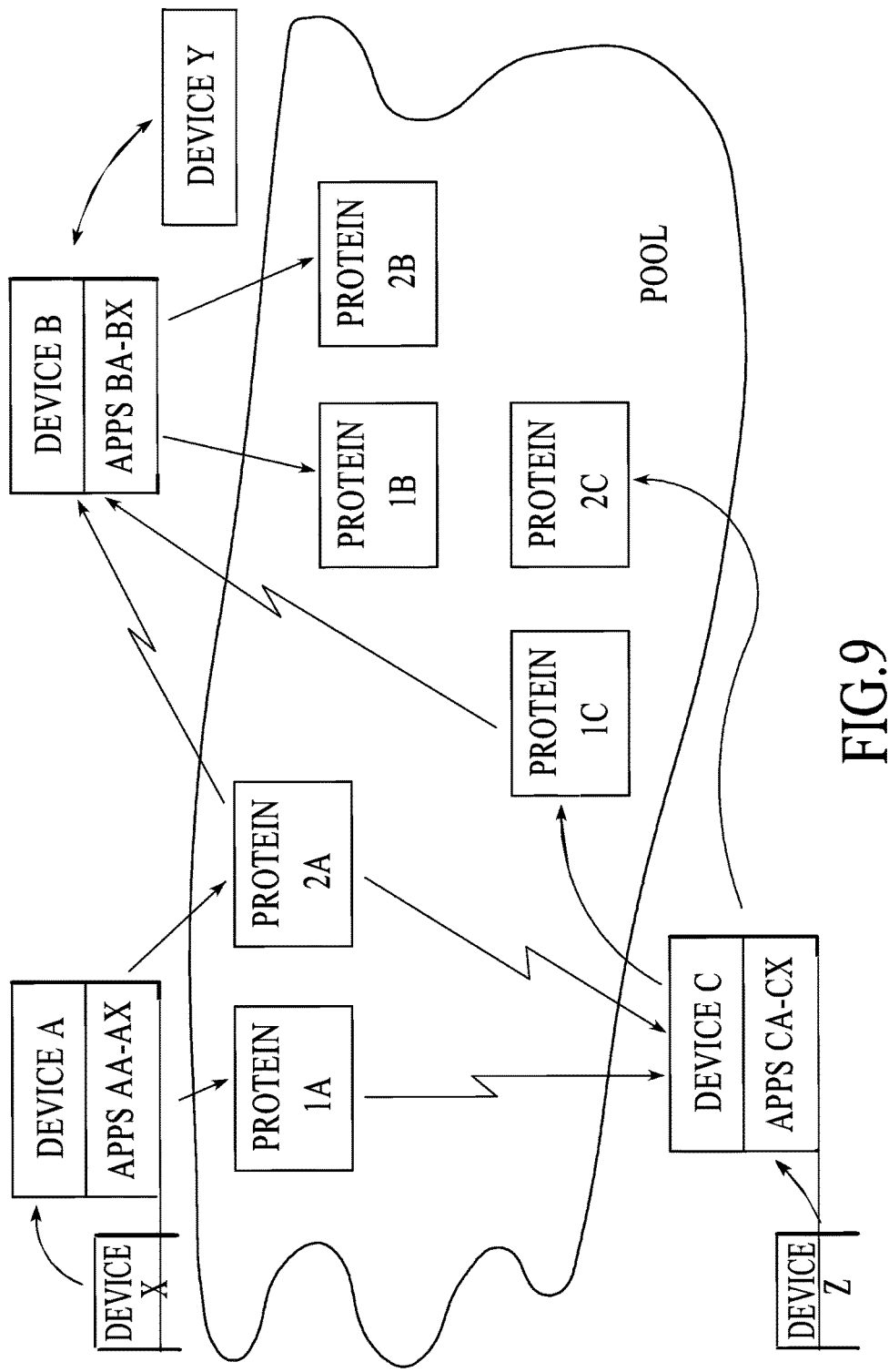

FIG. 9 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment.

Figure 10:
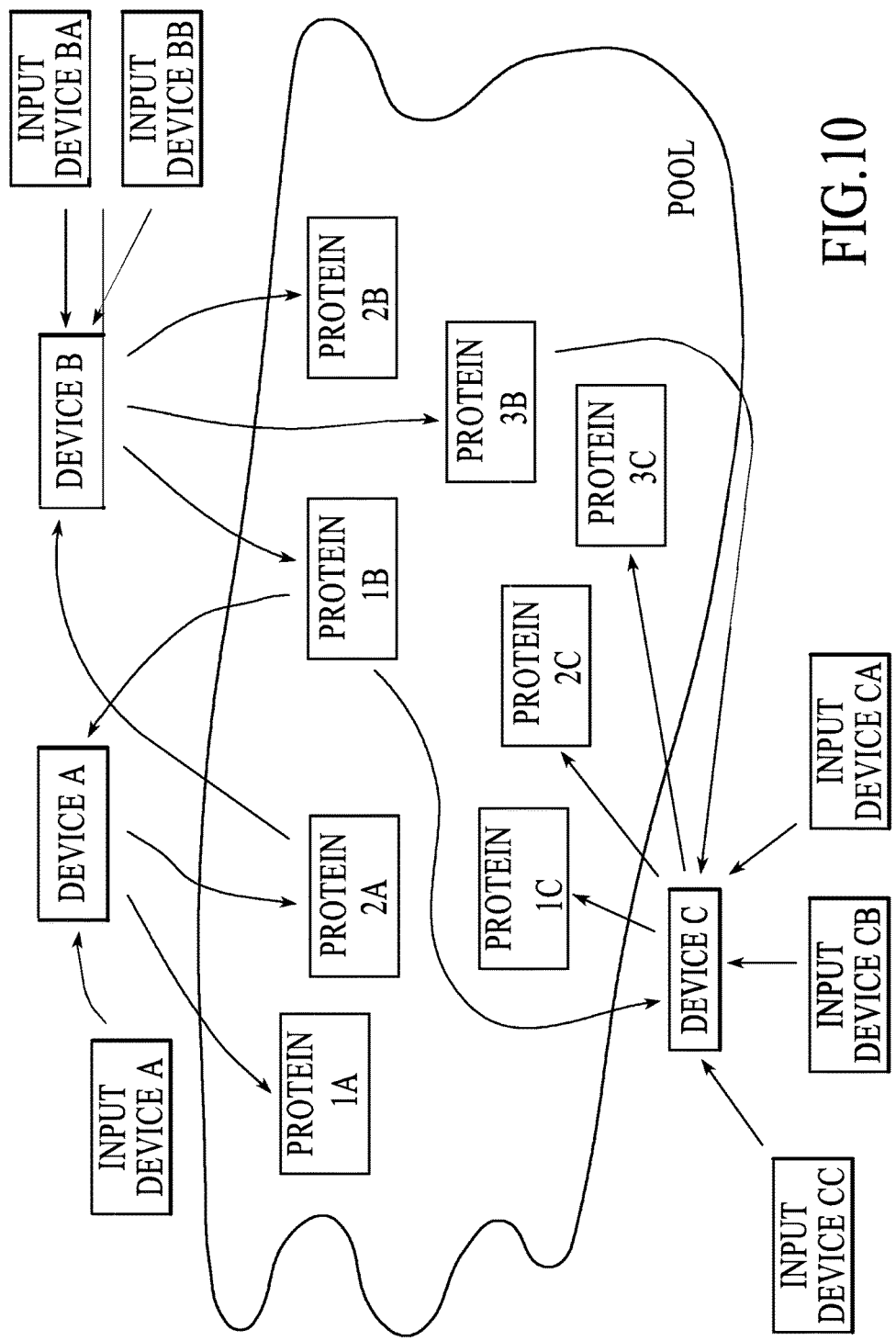

FIG. 10 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment.

Figure 11:
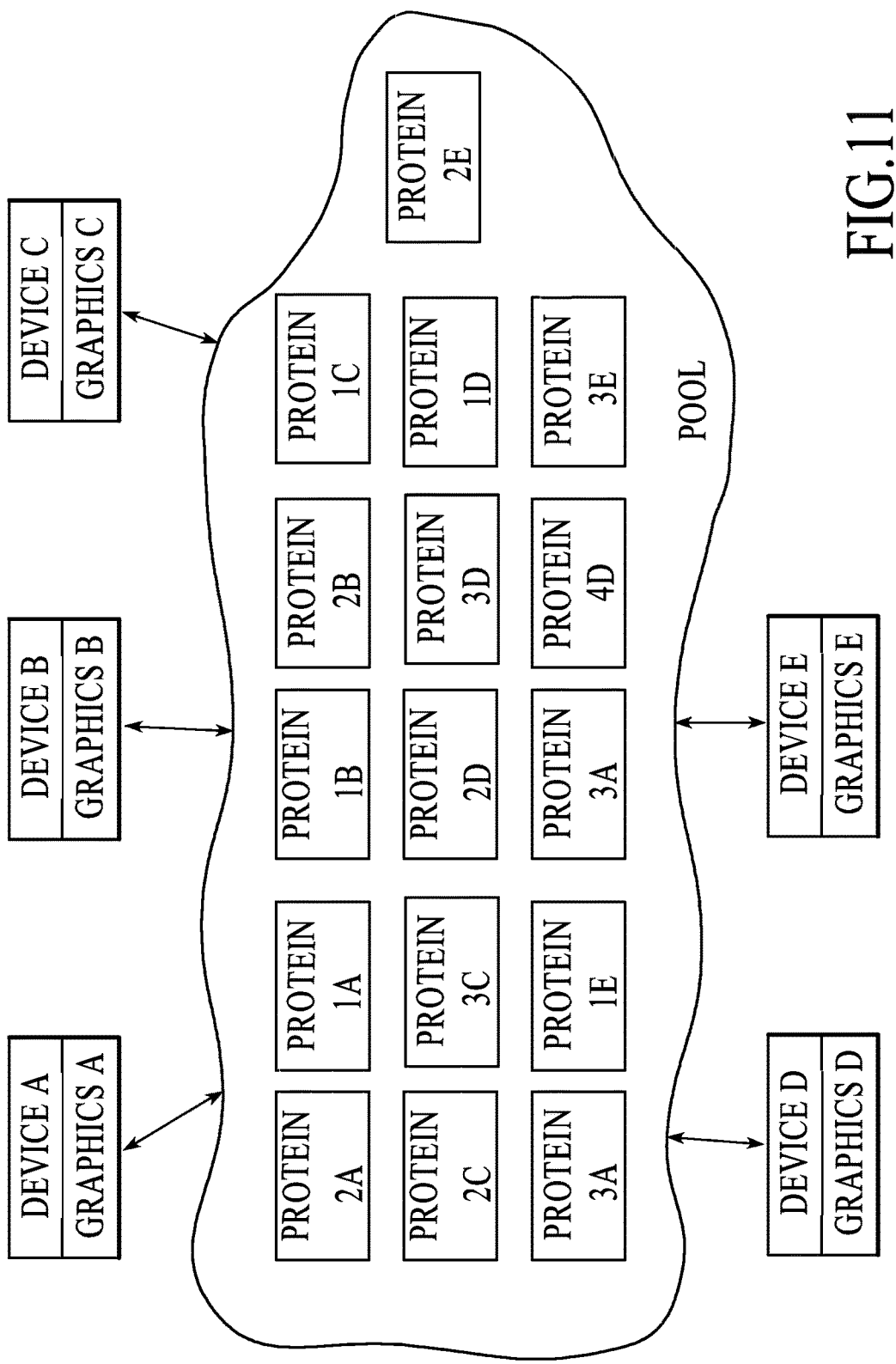

FIG. 11 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment.

Figure 12:
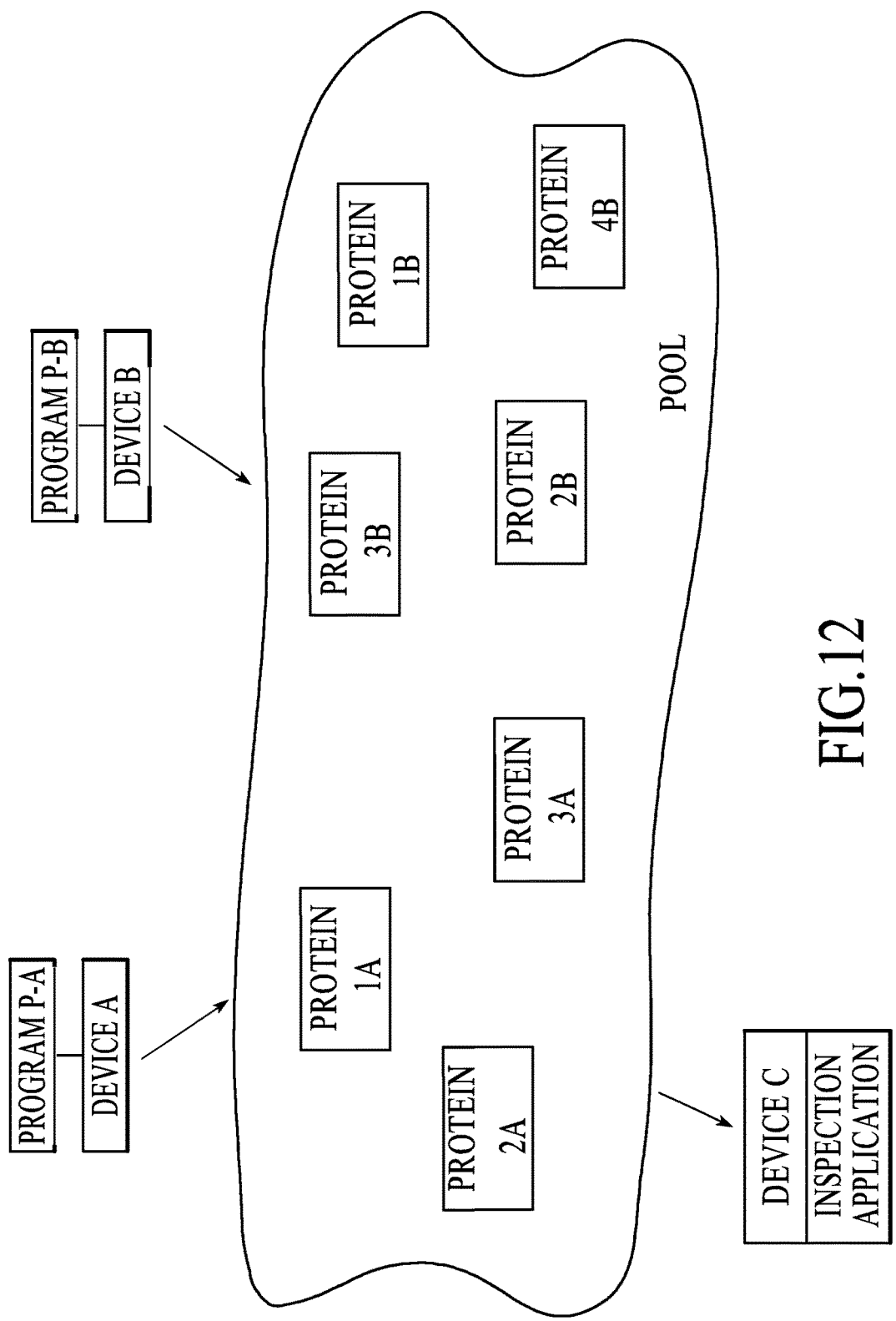

FIG. 12 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment.

Figure 13:
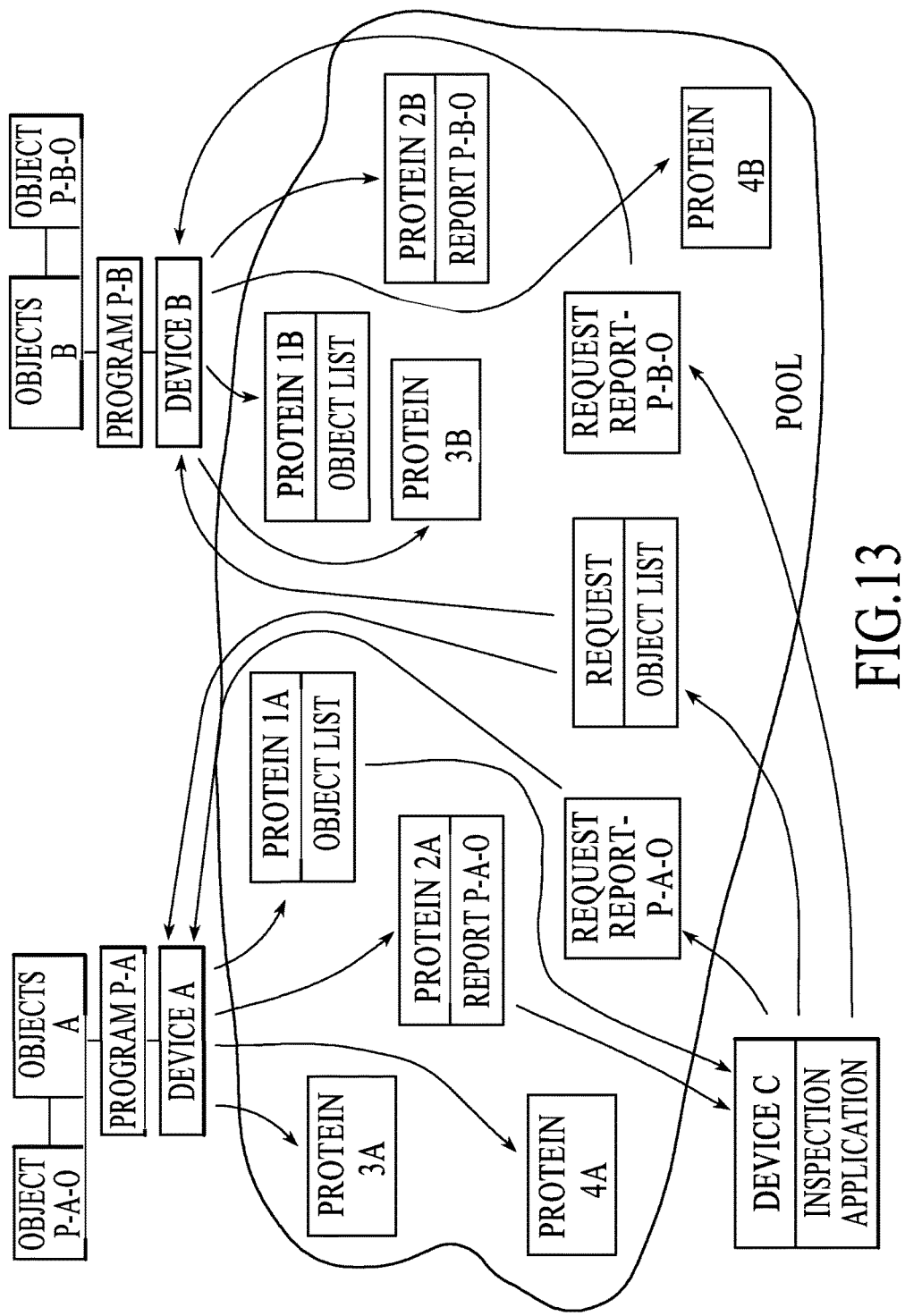

FIG. 13 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment.

DETAILED DESCRIPTION

Embodiments are taught herein that include a novel programming or processing environment that enables and encourages large scale multi-process interoperation. The embodiments provided herein overcome issues in conventional programming environments which do not fully support multi computer processing unit (CPU) and cross-network execution, or flexible sharing of data between large numbers of computing processes.

Methods and systems are described herein for encapsulating data that is to be shared between or across processes. These mechanisms include slawx (plural of "slaw"), proteins, and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

In the following description, numerous specific details are introduced to provide a thorough understanding of, and enabling description for, embodiments described herein. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The following terms are intended to have the following general meaning as they are used herein. The term "process" as used herein means a computer program executing for a period of time. This execution may be interrupted by pauses or transfers between processors or machines, so that a process is possibly suspended indefinitely and "serialized" or "marshaled" to disk, across a memory bus, or over a network. The preceding meaning can include other meanings as understood by one skilled in the art.

The term "device" as used herein means any processor-based device running one or more programs or algorithms, any processor-based device running under one or more programs or algorithms and/or any device coupled or connected to a processor-based device running one or more programs or algorithms and/or running under one or more programs or algorithms. The term "event" as used herein means any event associated with a running or executing program or algorithm, a processor-based device and/or a device coupled or connected to a processor-based device (e.g., an event can include, but is not limited to, an input, an output, a control, a state, a state change, an action, data (regardless of format of the data or stage in the processing from with which the data is associated), etc.).

FIG. 1 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

FIG. 2 is a block diagram of a protein, under an embodiment. The protein includes a length header, a descrip, and an ingest. Each of the descrip and ingest includes slaw or slawx, as described in detail below.

FIG. 3 is a block diagram of a descrip, under an embodiment. The descrip includes an offset, a length, and slawx, as described in detail below.

FIG. 4 is a block diagram of an ingest, under an embodiment. The ingest includes an offset, a length, and slawx, as described in detail below.

FIG. 5 is a block diagram of a slaw, under an embodiment. The slaw includes a type header and type-specific data, as described in detail below.

FIG. 6A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described in U.S. patent application Ser. No. 11/350,697, filed Feb. 8, 2006, and herein incorporated by reference in its entirety. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Referring to FIGS. 2 and 6, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^32 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and the next one. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIG. 6B shows a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little- vs. big-endianness) and floating-point representations; other differences exist. The Plasma specification requires that the data encapsulated by slawx be guaranteed interoperable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

A minimal (and read-only) protein implementation of an embodiment includes operation or behavior in one or more applications or programming languages making use of proteins. FIG. 6B is a flow diagram 650 for using proteins, under an embodiment. Operation begins by querying 652 the length in bytes of a protein. The number of descrips entries is queried 654. The number of ingests is queried 656. A descrip entry is retrieved 658 by index number. An ingest is retrieved 660 by index number.

The embodiments described herein also define basic methods allowing proteins to be constructed and filled with data, helper-methods that make common tasks easier for programmers, and hooks for creating optimizations. FIG. 6C is a flow diagram 670 for constructing or generating proteins, under an embodiment. Operation begins with creation 672 of a new protein. A series of descrips entries are appended 674. An ingest is also appended 676. The presence of a matching descrip is queried 678, and the presence of a matching ingest key is queried 680. Given an ingest key, an ingest value is retrieved 682. Pattern matching is performed 684 across descrips. Non-structured metadata is embedded 686 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

The proteins described above are provided to pools as a way of sharing the protein data contents with other applications. FIG. 7 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices. The proteins and pools of this example are as described above with reference to FIGS. 1-6.

FIG. 8 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

FIG. 9 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

FIG. 10 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

```
[ Descrips: { point, engage, one, one-finger-engage,
hand,
        pilot-id-02, hand-id-23 }
  Ingests: { pilot-id => 02,
        hand-id => 23,
     pos => [ 0.0, 0.0, 0.0 ]
        angle-axis => [ 0.0, 0.0, 0.0, 0.707 ]
        gripe => ..ˆ||:vx
        time => 184437103.29}]
```

As a further example, the protein describing a mouse click is as follows:

```
[ Descrips: { point, click, one, mouse-click, button-one,
    mouse-id-02 }
  Ingests: { mouse-id => 23,
    pos => [ 0.0, 0.0, 0.0 ]
    time => 184437124.80}]
```

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

FIG. 11 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

FIG. 12 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 12, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

FIG. 13 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

Examples of the systems and methods described above include a method comprising: detecting an event of a source device; generating at least one data sequence comprising device event data specifying the event and state information of the event, wherein the device event data and state information are type-specific data having a type corresponding to an application of the source device; and forming a data capsule to include the at least one data sequence, the data capsule having a data structure comprising an application-independent representation of the at least one data sequence.

The generating of the at least one data sequence of an embodiment comprises: generating a first respective data set that includes first respective device event data; generating a second respective data set that includes second respective state information; and forming a first data sequence to include the first respective data set and the second respective data set.

The generating of the first respective data set of an embodiment includes forming the first respective data set to include identification data of the source device, the identification data including data identifying the source device.

The generating of the at least one data sequence of an embodiment comprises: generating a first respective data set that includes first respective device event data; generating a second respective data set that includes second respective state information; and forming a second data sequence to include the first respective data set and the second respective data set.

The generating of the first respective data set of an embodiment includes generating a first respective data set offset, wherein the first respective data set offset points to the first respective data set of the second data sequence.

The generating of the second respective data set of an embodiment includes generating a second respective data set offset, wherein the second respective data set offset points to the second respective data set of the second data sequence.

The first respective data set of an embodiment is a description list, the description list including a description of the data.

The device event data of an embodiment is a tagged byte-sequence representing typed data.

The device event data of an embodiment includes a type header and a type-specific data layout.

The state information of an embodiment is a tagged byte-sequence representing typed data.

The state information of an embodiment includes a type header and a type-specific data layout.

The method of an embodiment comprises: generating at least one offset; and forming the data capsule to include the at least one offset.

The method of an embodiment comprises: generating a first offset having a first variable length; wherein the first offset points to the device event data of a first data sequence of the at least one data sequence.

The method of an embodiment comprises: generating a second offset having a second variable length; wherein the second offset points to the state information of a first data sequence of the at least one data sequence.

The method of an embodiment comprises: forming a first code path through the data capsule using a first offset of the at least one offset; forming a second code path through the data capsule using a second offset of the at least one offset; wherein the first code path and the second code path are different paths.

At least one of the first offset and the second offset of an embodiment include metadata, the metadata comprising context-specific metadata corresponding to a context of the application.

The method of an embodiment comprises: generating a header that includes a length of the data capsule; forming the data capsule to include the header.

The method of an embodiment comprises transferring the data capsule to a repository.

The method of an embodiment comprises: detecting a second event of a second source device; searching the repository for data capsules corresponding to the second event.

The method of an embodiment comprises: identifying a correspondence between the data capsule and the second event; extracting the data capsule from the repository in response to the identifying; and executing on behalf of the second source device a processing operation corresponding to the second event on behalf of the second source device in response to contents of the data capsule, wherein the source device corresponds to an application of a first type and the second source device corresponds to a second application of a second type.

The repository of an embodiment is coupled to a plurality of applications, the repository including a plurality of data capsules corresponding to the plurality of applications, the repository providing access to the plurality of data capsules by the plurality of applications, wherein at least two applications of the plurality of applications are different applications.

The repository of an embodiment provides state caching of a plurality of data capsules.

The repository of an embodiment provides linear sequencing of a plurality of data capsules.

The data structure of an embodiment is untyped.

The data structure of the data capsule of an embodiment provides a platform-independent representation of the device event data and the state information.

The data structure of the data capsule of an embodiment provides platform-independent access to the device event data and the state information.

The method of an embodiment comprises: transferring the data capsule from a first application having a first application type to at least one second application having at least one second application type, wherein the first application type is different than the second application type, wherein the generating of the at least one data sequence was executed by the first application; and maintaining intact the at least one data sequence of the data capsule during the transferring.

The method of an embodiment comprises using the at least one data sequence during operations of the second application.

The event of an embodiment comprises a user interface event.

The event of an embodiment comprises a graphics event.

The event of an embodiment comprises depositing of state information.

Examples of the systems and methods described above include a method comprising: generating a first data set that includes device event data and identification data of a source device, the device event data including data specifying an event registered by the source device, the identification data including data identifying the source device; generating a second data set that includes a full set of state information of the event; wherein each of the first data set and the second data set comprise typed data bundles in a type-specific data layout; and encapsulating the first data set and the second data set by forming a data capsule to include the first data set and the second data set, wherein the data capsule has a data structure comprising an application-independent representation of the at least one data sequence.

Examples of the systems and methods described above include a method comprising: detecting an event of a device running under an application of a first type; generating data sequences comprising device event data specifying the event and state information of the event, wherein the device event data and state information are type-specific data having a type corresponding to the application; forming a data capsule to include the data sequences, the data capsule having a data structure comprising an application-independent representation of the data sequences; detecting a second event of at least one second source device running under at least one second application having at least one second type, wherein the second type is different from the first type; identifying a correspondence between the data capsule and the second event; and executing an operation in response to the second event using contents of the data sequences of the data capsule.

The generating of the data sequences of an embodiment comprises: generating a first data set that includes the device event data; generating a second data set that includes the state information; and forming a first data sequence to include the first data set and the second data set.

The device event data of an embodiment is a tagged byte-sequence representing typed data.

The device event data of an embodiment includes a type header and a type-specific data layout.

The state information of an embodiment is a tagged byte-sequence representing typed data.

The state information of an embodiment includes a type header and a type-specific data layout.

The method of an embodiment comprises: generating at least one offset; and forming the data capsule to include the at least one offset.

The method of an embodiment comprises: generating a first offset having a first variable length, wherein the first offset points to the device event data of a first data sequence of the at least one data sequence; and generating a second offset having a second variable length, wherein the second offset points to the state information of a first data sequence of the at least one data sequence.

The method of an embodiment comprises: forming a first code path through the data capsule using a first offset of the at least one offset; forming a second code path through the data capsule using a second offset of the at least one offset; wherein the first code path and the second code path are different paths.

At least one of the first offset and the second offset of an embodiment include metadata, the metadata comprising context-specific metadata corresponding to a context of the application.

The method of an embodiment comprises transferring the data capsule to a repository.

The method of an embodiment comprises: searching the repository for data capsules corresponding to the second event; and extracting the data capsule from the repository in response to the identifying of the correspondence.

The repository of an embodiment is coupled to the application and the at least one second application, the repository including a plurality of data capsules corresponding to the application and the at least one second application, the repository providing access to the plurality of data capsules by the application and the at least one second application.

The repository of an embodiment provides state caching of a plurality of data capsules.

The repository of an embodiment provides linear sequencing of a plurality of data capsules.

The data structure of an embodiment is untyped.

The data structure of the data capsule of an embodiment provides a platform-independent representation of the device event data and the state information.

The data structure of the data capsule of an embodiment provides platform-independent access to the device event data and the state information.

Examples of the systems and methods described above include a method comprising: detecting an event of a first source device running under an application of a first type; generating data sequences comprising device event data specifying the event and state information of the event, wherein the device event data and state information are type-specific data having a type corresponding to the application; forming a data capsule to include the data sequences, wherein the data capsule has a data structure comprising an application-independent representation of the data sequences; placing the data capsule in a repository; detecting a second event of at least one second source device running under at least one second application having at least one second type; searching the repository and identifying a correspondence between the data capsule and the second event; and executing on behalf of the second source device an operation corresponding to the second event using contents of the data sequences of the data capsule.

The systems and methods described herein, including systems and methods for encapsulating data through the use of slawx, proteins, and pools, and transferring and using the encapsulated data, include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the programming environment is not intended to be exhaustive or to limit the systems and methods described to the precise form disclosed. While specific embodiments of, and examples for, the programming environment are described herein for illustrative purposes, various equivalent modifications are possible within the scope of other systems and methods, as those skilled in the relevant art will recognize. The teachings of the programming environment provided herein can be applied to other processing systems and methods, not only for the systems and methods described above.

The elements and acts of the various embodiments described above can be combined to provide further embodiments. These and other changes can be made to the programming environment in light of the above detailed description.

The invention claimed is:

1. A method comprising:
a first device running a first application;
a second device running a second application;
the first application generating first raw input data in response to a first user action of a first user of the first application, the first raw input data including a full set of state information for the first user action;
the second application generating second raw input data in response to a second user action of a second user of the second application, the second raw input data including a full set of state information for the second user action;
the first application of the first device adding the first raw input data to a first protein structure, adding first semantic data to the first protein structure, and depositing the first protein structure into an input repository of a third device via a network connection;
the second application of the second device encapsulating adding the second raw input data to a second protein structure, adding second semantic data to the second protein structure, and depositing the second protein structure into the input repository of the third device;
the third device identifying protein structures in the input repository that include semantic data that matches a pattern;
responsive to a determination that the first semantic data included in the first protein structure matches the pattern, the third device extracting the first protein structure from the input repository via a local memory bus of the third device;
responsive to a determination that the second semantic data included in the second protein structure matches the pattern, the third device extracting second protein structure from the input repository via the local memory bus of the third device; and
the third device using the first raw input data of the extracted first protein structure and the second raw input data of the extracted second protein structure to process at least one event corresponding to the first protein structure and the second protein structure,
wherein the first protein structure and the second protein structure have a same record format,
wherein the first semantic data identifies the first user action and the second protein structure second semantic data identifies the second user action,
wherein the first protein structure includes an application-independent representation of the first raw input data, and
wherein the second protein structure includes an application-independent representation of the second raw input data.

2. The method of claim 1, wherein a first input device of the first device generates the first raw input data, wherein a second input device of the second device generates the second raw input data.

3. The method of claim 1, wherein the first protein structure specifies the first user action and information identifying an input device of the first raw input data, and wherein the second protein structure specifies the second user action and information identifying an input device of the second raw input data.

4. The method of claim 3, wherein the input device of the first raw input data is different from the input device of the second raw input data.

5. The method of claim 3, wherein the first semantic data specifies a semantic meaning for the first user action, and wherein the second semantic data specifies a semantic meaning for the second user.

6. The method of claim 5, wherein the third device extracts the first protein structure based on the semantic meaning for the first user action.

7. The method of claim 6, wherein the third device extracts the second protein structure based on the semantic meaning for the second user action.

8. The method of claim 6, wherein the third device extracts the second protein structure based on the second user action.

9. The method of claim 3, wherein the third device extracts the first protein structure based on the first user action.

10. The method of claim 9, wherein the third device extracts the second protein structure based on a semantic meaning for the second user action that is specified by the first protein structure.

11. The method of claim 9, wherein the third device extracts the second protein structure based on the second user action.

12. The method of claim 3, wherein the input device of the first raw input data is one of a gestural input sensor, a keyboard, a mouse, and an infrared remote control.

13. The method of claim 12, wherein the input device of the second raw input data is a gestural input sensor.

14. The method of claim 1, wherein the first device deposits the first protein structure into the input repository via at least one of the local memory bus and a network connection, and wherein the second device deposits the first protein structure into the input repository via at least one of the local memory bus and a network connection.

15. The method of claim 1, wherein the first semantic data comprises a first human-readable description of the first user action and the second semantic data comprises a second human-readable description of the second user action.

16. The method of claim 15,
wherein the pattern identifies a user action,
wherein the pattern is compared with the first human-readable description to determine that the first semantic data included in the first protein structure matches the pattern, and
wherein the pattern is compared with the second human-readable description to determine that the second semantic data included in the second protein structure matches the pattern.

17. A system comprising:
a first device constructed to run a first application;
a second device constructed to run a second application; and
a third device that comprises an input repository,
wherein the first application is constructed to generate first raw input data in response to a first user action of a first user of the first application, the first raw input data including a full set of state information for the first user action,
wherein the second application is constructed to generate second raw input data in response to a second user action of a second user of the second application, the second raw input data including a full set of state information for the second user action,
wherein the first application is constructed to add the first raw input data to a first protein structure, add first semantic data to the first protein structure, and deposit the first protein structure into the input repository via a network connection,
wherein the second application is constructed to add the second raw input data to a second protein structure, add second semantic data to the second protein structure, and deposit the second protein structure into the input repository,
wherein the third device is constructed to:
identify protein structures in the input repository that include semantic data that matches a pattern,
responsive to a determination that the first semantic data included in the first protein structure matches the pattern, extract the first protein structure from the input repository via a local memory bus of the third device,
responsive to a determination that the second semantic data included in the second protein structure matches the pattern, extract the second protein structure from the input repository via the local memory bus of the third device,
wherein the third device is constructed to use the first raw input data of the extracted first protein structure and the second raw input data of the extracted second protein structure to process at least one event corresponding to the first protein structure and the second protein structure,
wherein the first protein structure and the second protein structure have a same record format,
wherein the first semantic data identifies the first user action and the second semantic data identifies the second user action,
wherein the first protein structure includes an application-independent representation of the first input raw data, and
wherein the second protein structure includes an application-independent representation of the second raw input data.

18. The method of claim 1, wherein a first gestural input sensor of the first device generates the first raw input data, wherein a second gestural input sensor of the second device generates the second raw input data, wherein the first raw input data corresponds to the first user action, and wherein the second raw input data corresponds to the second user action.

19. The method of claim 18, wherein the third device runs a third application, and wherein the third application uses the first raw input data of the first protein structure and the second raw input data of the second protein structure to process the at least one event corresponding to the first protein structure and the second protein structure, wherein the third application is different from the first application and the second application.

20. The method of claim 18,
wherein the third device runs a third application, and wherein the third application updates graphical output of the third device based on the first raw input data of the first protein structure and the second raw input data of the second protein structure,
wherein the third application is different from the first application and the second application,
wherein the first protein structure specifies the first user action and information identifying the first device,
wherein the second protein structure specifies the second user action and information identifying the second device,
wherein the third application extracts the first protein structure from the input repository based on the first user action, and
wherein the third application extracts the second protein structure from the input repository based on the second user action.

* * * * *